Aug. 27, 1946.　　　　G. J. AGULE　　　　2,406,310
BERYLLIUM BRAZING
Filed Feb. 11, 1944
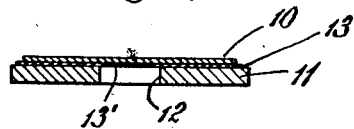
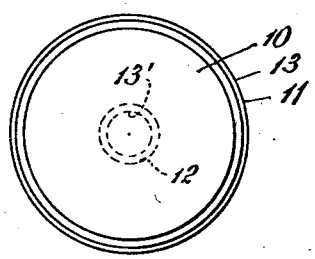
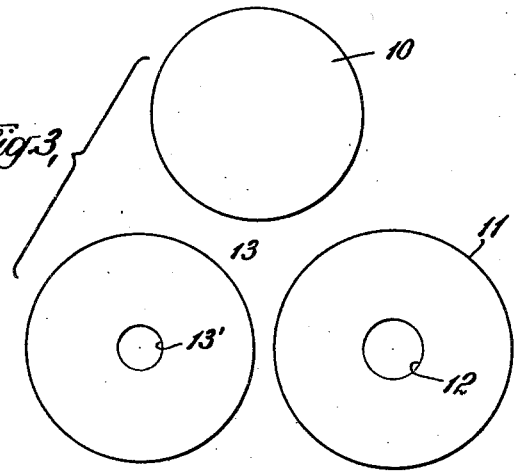
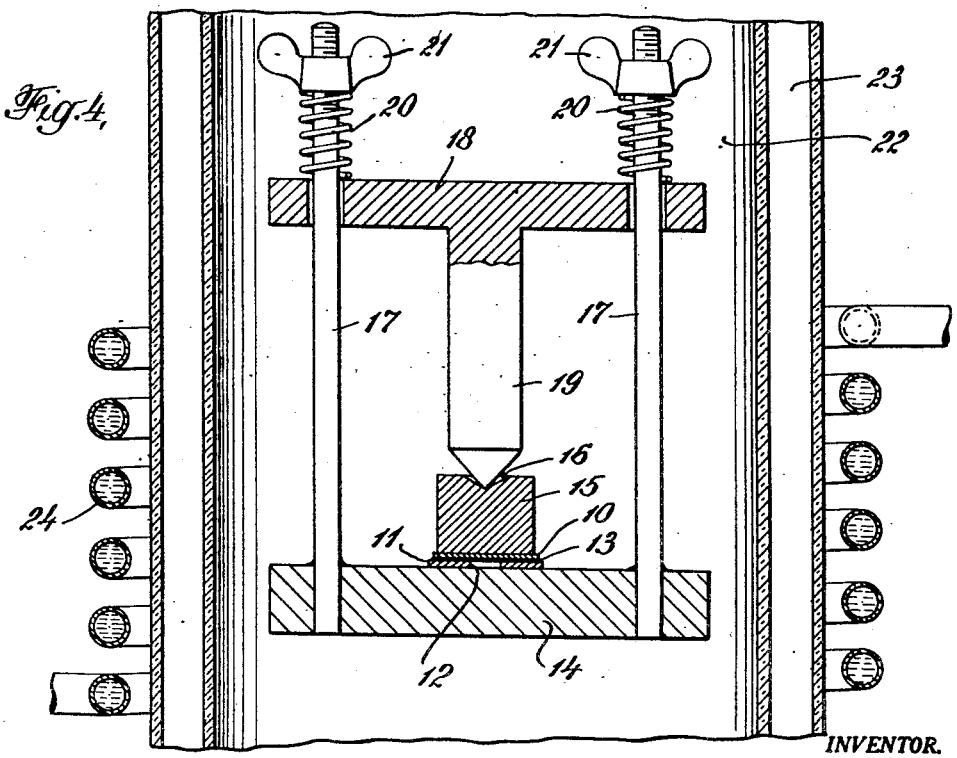
INVENTOR.
BY George J. Agule
ATTORNEYS Patented Aug. 27, 1946

2,406,310

UNITED STATES PATENT OFFICE 2,406,310

BERYLLIUM BRAZING

George J. Agule, Stamford, Conn., assignor to Machlett Laboratories Incorporated, Springdale, Conn., a corporation of Connecticut Application February 11, 1944, Serial No. 522,013

2 Claims. (Cl. 113—112)

This invention relates to the brazing of beryllium and beryllium-like materials to metallic bases to form tight joints and is concerned more particularly with a novel method by which satisfactory joints can be made between such materials and bases. In addition, the invention includes an apparatus by which the new method can be easily and conveniently practiced.

Beryllium and materials having substantially the characteristics of beryllium, such as that disclosed in Claussen Patent No. 2,306,592, issued December 29, 1942, may be employed to great advantage in X-ray work because of their high degree of transparency to the passage of X-rays, and in one such use, the beryllium member forms part of the envelope of the X-ray tube and serves as a window through which the X-rays pass. In another application, the beryllium member lies within the evacuated space and acts as a screen to intercept electrons which would otherwise injuriously bombard portions of the structure. In the first use, the beryllium member is conveniently joined to a metallic base of some sort and the joint must not only be vacuum-tight but also capable of withstanding the temperatures, to which the tube is subjected in the processing operations, without becoming leaky. In the case of the screen or shield, the beryllium member is commonly secured to a metallic support and, in both instances, brazing is a desirable way of mounting the member in place.

The brazing of beryllium to a base metal to make a good joint is a difficult operation, in that many of the metals and alloys commonly used for soldering and brazing will not wet beryllium, and, although other metals will wet beryllium when the parts are heated under vacuum conditions, the joints so formed are porous. Another difficulty encountered is the solubility of molten beryllium in various brazing media with the formation, in some instances, of an alloy of low melting point or the development in the joint of a layer of compound which is highly brittle.

It has been ascertained by investigation that copper may be used as a brazing medium to secure beryllium to the alloy known commercially as "Kovar," to steel, and to nickel and nickel-copper alloys, and silver and a silver-beryllium alloy containing about 1% of beryllium are also useful in uniting beryllium to certain bases. A copper-silver alloy containing about 50% of each constituent may be employed as a brazing medium for beryllium under certain conditions. These brazing media do not, however, produce joints equally satisfactory for all conditions of use, as, for example, a joint in which beryllium is secured to "Kovar" by copper may be initially vacuum-tight, if properly made, but will become leaky when subjected to prolonged reheating at temperatures of about 600° C., which are encountered in the processing of X-ray tubes. Such a joint might, therefore, be satisfactory if the beryllium were to be employed as an internal screen within the evacuated space, but if the beryllium member were to form the X-ray window and be part of the tube envelope, the joint would not be acceptable. As disclosed in Claussen application Serial No. 450,859, filed July 14, 1942, joints between beryllium and a base, which are vacuum-tight and can withstand prolonged reheating at elevated temperatures without becoming leaky, can be made by the use of specific brazing media with specific bases, as, for example, copper as a brazing medium and nickel or nickel-copper alloys as the base, and such joints, if properly made, are satisfactory for all uses in the X-ray field. However, it has not been easy heretofore to make perfect joints in all instances, regardless of the brazing medium and base used.

The present invention is, accordingly, directed to the provision of a method by which members of beryllium and materials having the characteristics of beryllium may be readily brazed to metallic bases of different sorts, the use of the new method making possible the formation of satisfactory joints having characteristics depending upon the nature of the brazing media and the bases used. According to the new method, the beryllium member and the base, with an intervening layer of the brazing medium, are mounted on a support with at least one edge of the joint lying within a relatively small confined space. Pressure is applied to the assembly to hold the parts thereof in close contact and the assembly and support are placed within a chamber, which is then evacuated. The assembly is then heated electrically, as by high frequency induction currents, to cause the brazing medium to melt, and as soon as this occurs, the heating is discontinued.

For a better understanding of the invention, reference may be had to the accompanying drawing, in which Figs. 1 and 2 are sectional and plan views, respectively, of a joint assembly to be united by the method of the invention;

Fig. 3 is a plan view of the three elements of the assembly shown separately; and Fig. 4 is a vertical sectional view through a portion of the apparatus used in making the joint.

The drawing illustrates the use of the new method in the formation of a joint between a beryllium member and a base, the complete assembly being useful as a part of the envelope of an X-ray tube, with the beryllium member serving as the window. The beryllium member 10 is shown in the form of a thin flat circular disc, which may be of any convenient size and is preferably of a thickness of the order of 0.020″. Such a member may be made of the beryllium material of Claussen Patent No. 2,306,592, above mentioned, by rolling in the manner described in the patent.

The beryllium disc is to be secured to a base 11 having an opening 12 therethrough and the base has a diameter at least slightly greater than the diameter of the member, and is of any suitable thickness. The brazing medium is employed in the form of a washer 13 which is preferably about 0.003″ thick and should be of such overall diameter as to project outwardly beyond the edge of the beryllium member to a slight extent, for example, 1/32″. The opening 13′ through the washer has a diameter slightly less than the diameter of the opening 12 through the base, as, for example, the opening through the washer may be 1/16″ smaller in diameter than the opening through the base, so that when the parts are properly aligned, the inner edge of the washer extends inwardly of the wall of the opening about 1/32″.

In the formation of a structure which is to form part of the envelope of an X-ray tube, the brazing medium is preferably copper and the base nickel or a nickel-copper alloy, such as Monel metal. In the formation of structures for other purposes, other combinations of brazing media and bases may be used, depending on the purpose for which the structure is to be employed.

In securing together the parts of the assembly shown in Fig. 1, the assembly is placed on a support 14 in the form of a plate which is solid and has a flat top, so that when the assembly is placed therein, the upper face of the support closes the opening 12 through the base and the inner edge of the joint is thus within a relatively small confined space. A block 15 having a depression 16 in its upper surface is then placed on top of the assembly, the diameter of the block being approximately that of the beryllium member.

The support is provided with a pair of rods 17 extending upwardly therefrom and a pressure head 18 is mounted on the rods for sliding movement. This head has a downward projection 19 terminating in a pointed end receivable in the depression in the block. The rods 17 are threaded at their free ends and springs 20 are mounted on the rods to rest with their lower ends on top of the head 18. Each rod is provided with a wing nut 21 by which the springs may be compressed to force the head downward and compress the joint assembly between the support 14 and block 15. The support and its associated parts are preferably made of a heat resistant metal, such as molybdenum.

When the joint assembly has been placed in position on the support and pressure applied by tightening the wing nuts, the support and its associated parts are inserted within a chamber 22 and mounted in place therein in any convenient manner, as by suspension. The chamber 22 is constructed so that it may be evacuated and is of the type commonly used in vacuum heating or casting. The chamber has double glass walls 23 and a cooling medium is circulated through the space between the walls.

When the chamber has been closed, the evacuation is started and when a vacuum of about 10 microns has been obtained, electrical heating means, such as a high frequency coil 24, is placed about the chamber in alignment with the support and assembly and the assembly is then heated, until the temperature of at least 700° C. and preferably higher has been reached and the washer of brazing metal has melted. The duration of the heating should be as short as possible, so long as complete melting of the brazing metal is obtained. After the heating operation is completed, the assembly is allowed to cool and the support and its associated parts are then removed from the chamber and the joint structure removed.

In the heating operation, the melting of the brazing metal while the joint assembly is compressed, causes the molten metal to flow out of the joint and, if a continuous fillet of molten metal is formed all around the edge of the beryllium disc, a satisfactory joint will be obtained. I have found, however, that if the edges of the joint are exposed to the interior of the chamber, the molten metal will frequently appear in the form of small drops which do not run together to form a continuous fillet. However, if an edge of the joint is within a relatively small confined space, such a continuous fillet will be formed. In the construction illustrated, the diameter of the opening through the base is about 1/2″ and the base is about 1/16″ thick, so that the confined space about the inner edge of the joint is quite small.

There are a number of possible explanations as to why shutting off the space to which an edge of the joint is exposed, as above explained, produces the continuous fillet desired, and I am unable to determine just what the action is. However, I have found that by the practice of the new method, I am able to obtain satisfactory joints without difficulty, whereas when other methods are used, the results are uncertain. The new method is particularly useful in making vacuum-tight joints capable of withstanding prolonged reheating at high temperatures, without becoming leaky, and, by proper selection of the base and brazing medium and the use of the new method, satisfactory joints of the type referred to can be easily produced.

I claim:

1. A method of securing a member made substantially entirely of beryllium to a metallic base to close an opening in the base, which comprises placing a washer of a brazing medium on the base to encircle the opening, placing the member upon the washer to close one end of the opening, placing the base with the washer and member in place thereon upon a support making contact with the base around the other end of the opening and closing the opening at said other end, applying pressure to the member tending to move it toward the base, evacuating the space about the base and the assembled parts thereon, and heating the assembled parts until the washer has melted and molten brazing medium has issued from between the member and base.

2. A method of securing a disc made substantially entirely of beryllium to a metallic base to close an opening in the base, which comprises placing a washer of a brazing medium upon the base to encircle the opening, the washer having an internal diameter slightly smaller than the diameter of the opening so that the inner edge of the washer overhangs the opening, the outer diameter of the washer being slightly greater than that of the disc, placing the disc upon the washer centrally thereof to close one end of the opening, placing the base with the washer and disc in place thereon upon a support making contact with the base around the other end of the opening and closing the opening at said other end, applying pressure to the disc tending to move it toward the base, evacuating the space about the base and the assembled parts thereon, and heating the assembled parts until the washer has melted and the molten brazing medium has issued from between the member and base.

GEORGE J. AGULE.